bardella et al.

(12) United States Patent
Bardella et al.

(10) Patent No.: US 7,615,713 B2
(45) Date of Patent: Nov. 10, 2009

(54) MOUNTING STRUCTURE FOR WIRING HARNESS

(75) Inventors: Edward J. Bardella, Jamestown, PA (US); Joseph A. Wilson, Cortland, OH (US); Ronald A. Puhl, Poland, OH (US); Theodore J. Borowicz, Van Buren Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 11/633,958

(22) Filed: Dec. 5, 2006

(65) Prior Publication Data
US 2008/0128165 A1  Jun. 5, 2008

(51) Int. Cl.
*H02G 3/18* (2006.01)
(52) U.S. Cl. .............. 174/650; 174/153 G; 174/152 G; 16/2.1; 16/2.2; 248/56
(58) Field of Classification Search ............. 174/650, 174/153 G, 152 R, 152 G, 72 A, 135, 142, 174/17 CT, 151; 16/2.1, 2.2; 248/56; 439/587
See application file for complete search history.

(56) References Cited

U.S. PATENT DOCUMENTS

| 6,051,790 | A | 4/2000 | Takeuchi et al. | |
| 6,431,642 | B2 * | 8/2002 | Sora et al. | 174/153 G |
| 6,479,748 | B2 | 11/2002 | Mori | |
| 7,020,931 | B1 * | 4/2006 | Burnett et al. | 174/152 G |
| 7,053,304 | B2 * | 5/2006 | Ojima et al. | 174/72 A |
| 7,053,305 | B2 | 5/2006 | Takase et al. | |
| 7,244,894 | B1 * | 7/2007 | Lipp | 174/152 G |
| 2001/0006113 | A1 | 7/2001 | Mori | |
| 2002/0014789 | A1 | 2/2002 | Sora et al. | |
| 2005/0150678 | A1 | 7/2005 | Takase et al. | |
| 2006/0243484 | A1 | 11/2006 | Serizawa et al. | |

* cited by examiner

*Primary Examiner*—Angel R Estrada
(74) *Attorney, Agent, or Firm*—Thomas N. Twomey (57) ABSTRACT

A mounting structure for a wire harness for use in a movable structure, such as a door of a passenger vehicle, is disclosed. The mounting structure may include a mounting frame and a bracket for use in a recess of the movable structure. The mounting structure may be installed on a movable structure such that water may contact the mounting frame. The mounting frame may include water management features that generally direct water away from a dry region. Such water management features may include one or more cut-aways formed in an outer periphery of the mounting frame, and may also include one or more dams and/or sub-dams. The cut-aways, dams, and sub-dams may be used to re-direct water away from the dry region.

17 Claims, 7 Drawing Sheets

MOUNTING STRUCTURE FOR WIRING HARNESS

FIELD OF THE INVENTION

The invention relates generally to a mounting structure for a wiring harness and, more particularly, to a mounting structure having water management features.

BACKGROUND

Sound and moisture barrier requirements for today's passenger vehicles, as well as other devices containing electrical wiring, are becoming increasingly more stringent. Aside from a desire to provide a dry, quiet interior for vehicle occupants, an important design consideration is to protect the vehicle's numerous electrical components and their associated wiring, particularly when designing vehicle doors. Similar design issues are also present in a variety of electrical devices wherein wiring passes between components that move relative to one another. Conventional solutions include using weather-stripping along the edges of the two components, such as along an inside edge of a vehicle door and along a mating edge of a door jam on the vehicle body. Although effective for providing a generally watertight seal between the door and the vehicle body, protecting the electrical components and wiring for vehicle features such as locks and automatic window controls, is often a more challenging task. The wires are generally joined together (referred to as a "wiring harness" or "wire harness") in the door and extend from an opening in the door to the vehicle body. Due to the inherent geometry of the door as it is attached to the vehicle body, there will generally always be a section of wiring harness that may be partially exposed to various levels of moisture.

When routing a wire harness between components that move relative to each other, such as between a door of a vehicle and the vehicle body, three basic regions of varying varying moisture content may be considered; a wet region, a moist region and a dry region. For example, referring again to the example of a motor vehicle, the wet region lies between the exterior of the vehicle and a primary weather stripping that is vertically mounted to an edge face of the door. Water that is able to penetrate into this region is generally repelled by the primary weather stripping. However, some water may penetrate past the primary weather stripping into what is referred to as the moist region. The moist region is defined as the area between the primary weather stripping and a secondary weather stripping that is mounted along an edge of the vehicle body. The secondary weather stripping reduces wind noise and creates a final water barrier between the moist region and the dry region, such as the passenger compartment. To protect the component wiring from exposure to moisture and other contaminants, the wire harness is generally sealed or covered by a grommet or other mounting structure. In some cases, the grommet or mounting structure extends from the wet region through the moist region to the dry region. In other words, at least a portion of the grommet or mounting structure is exposed to each of the three regions. In this way, the grommet or mounting structure undesirably provides a path for water to seep from the wet or moist regions into the dry region. A shortfall with existing grommets and mounting structures is that they fail to control or manage this water penetration in the moist region. If not properly managed, the water will travel along the body of the mounting structure and into the dry region. The embodiments disclosed herein were developed in light of these and other drawbacks with existing grommet and mounting structures.

DETAILED DESCRIPTION

A wire harness mounting structure for use in a device having a plurality of components that move relative to one another, for example a passenger vehicle, is disclosed. In an exemplary embodiment, a mounting structure secures a wire harness to a movable structure, such as a vehicle door, and protects the wires from exposure to moisture and/or contaminants. The mounting structure spans each of three regions (i.e., wet, moist, and dry regions) between the movable structure and a fixed structure (e.g., between a vehicle door and body). In some cases, water from the vehicle exterior can enter the wet region and seep into the moist region. The disclosed mounting structure includes water management features that re-direct the flow of water in the moist region such that the water travels along a desired path and is prevented from seeping into the dry region of the vehicle (i.e., the passenger compartment). The water management features include cut-aways and dams that are selectively shaped and located to direct the water away from the dry region.

Mounting Structure

Figure 1:
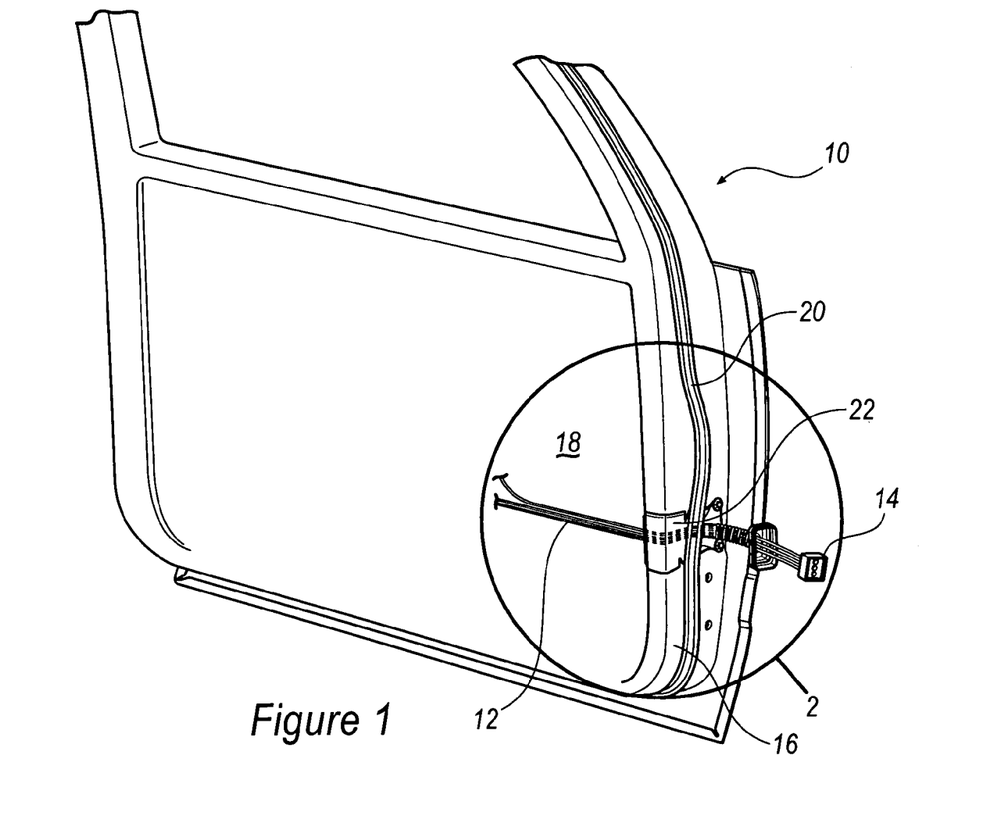
FIG. 1 illustrates an exemplary mounting structure installed on a movable structure, such as a vehicle door, according to an embodiment.

FIG. 1 illustrates a portion of a movable structure 10 that attaches to a fixed structure, in this case a door and body of a vehicle. Movable structure 10 generally includes electrical components and controls for various vehicle features such as power windows and locks (not shown). The wiring for these components are often bundled together to form a wire harness 12. The wire harness 12 is generally routed along the interior of movable structure 10 and into the fixed structure where a connector 14 on the end of wire harness 12 connects into a complementary receptacle in the fixed structure (not shown). As shown in FIG. 1, movable structure 10 generally includes an edge face 16, an inner panel 18, and a primary weather stripping 20. The wire harness 12, which is generally routed along inner panel 18 and around to edge face 16, is secured in place with a mounting structure 22.

Figure 2:
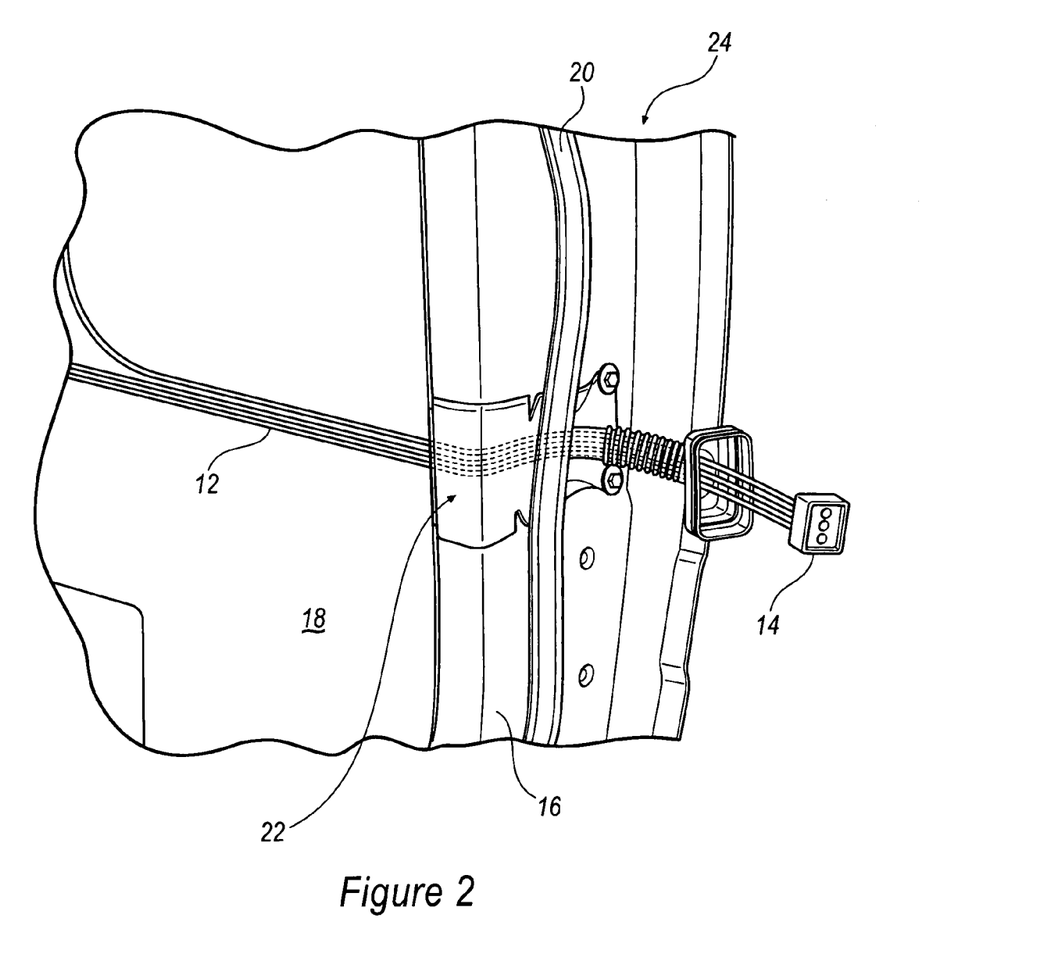
FIG. 2 is an enlarged view of an exemplary mounting structure according to FIG. 1.
Figure 3:
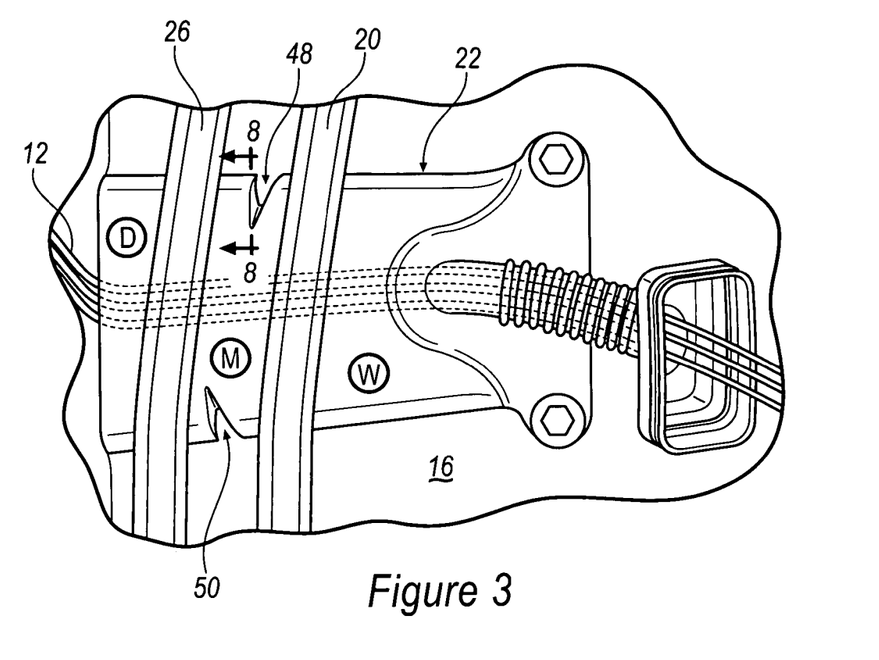
FIG. 3 illustrates an exemplary mounting structure installed on a movable structure, such as a vehicle door, that is in a closed position.

FIG. 2 illustrates an enlarged view of a wire harness mounting structure assembly 24 according to FIG. 1. Movable structure 10 generally attaches to the fixed structure with hinges that allow movable structure 10 to pivot between an open position and a closed position. FIG. 2 illustrates an end view of movable structure 10, as it would appear in an open position. FIG. 3, on the other hand, illustrates movable structure 10 in a closed position, wherein edge face 16 confronts a corresponding edge face of the fixed structure. In this closed position, the movable structure assembly can be shown to include a secondary weather stripping 26 that runs substantially parallel with primary weather stripping 20. In the closed position, both primary and secondary weather strippings 20, 26 are pressed in between edge face 16 and the fixed structure, creating two compression or interference seals. Furthermore, as shown in FIG. 3, when movable structure 10 is placed in the closed position, primary and secondary weather strippings 20, 26 form three distinct regions; a wet region (W), a moist region (M), and a dry region (D).

The wet region W is generally considered a wet zone and lies between the outside environment and primary weather stripping 20. Water typically enters the wet region W by seeping through a gap created between movable structure 10 and the fixed structure when the movable structure is in a closed position. This gap is required so that movable structure 10 can freely move between an open and closed position. Generally, water entering the wet region W exits by flowing down, along primary weather stripping 20, and out onto the road through the gap in between movable structure 10 and the fixed structure. Although the interference seal created by primary weather stripping 20 is effective in preventing a majority of water from traveling beyond the wet region W, some water is generally expected to migrate into the moist region M. The moist region M is generally considered a moist zone and lies between primary and secondary weather strippings 20, 26. Water entering the moist region M is also directed downward along weather strippings 20, 26 and exits through the gap at the bottom of movable structure 10. The dry region D is generally considered a dry zone and lies between secondary weather stripping 26 and the dry region. Secondary weather stripping 26 generally defines the boundary between the exterior of the vehicle, and the interior passenger compartment. In some cases, due to the inherent properties of water, the mounting structure 22 can serve as a pathway for water to travel from the moist region to the dry region. While some water may be expected in the moist region M, no water should enter the dry region D. Although described as having three regions, some vehicles may only have one weather stripping that forms only a wet and a dry region. Mounting structure 22 may also be used for such applications in the same manner as described below.

Figure 4:
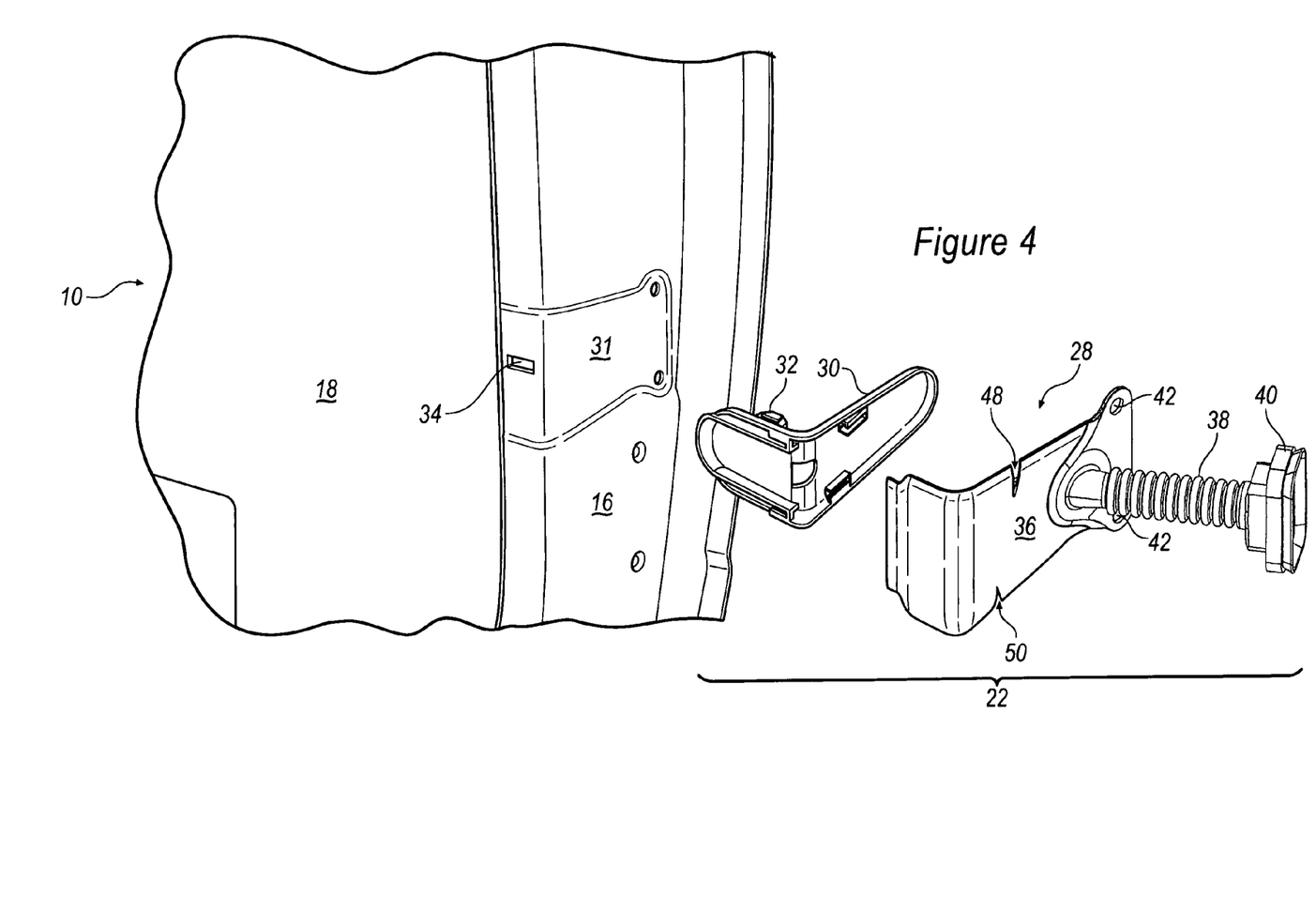
FIG. 4 is an exploded view of an exemplary mounting structure, according to an embodiment.

FIG. 4 illustrates an exploded view of an exemplary mounting structure 22, which generally comprises a two-part system having a mounting frame 28 and corresponding bracket 30. Bracket 30 is a unitary, generally L-shaped structure adapted to fit within a recess 31 of movable structure 10 and is generally a rigid or semi-rigid component made of plastic, rubber, or any other suitable material. Bracket 30 may also include tab 32, which is generally a protruding fastener such as a winged insert for securing bracket 30 to movable structure 10. In one embodiment, movable structure 10 includes a slot 34 in inner panel 18 adapted to receive tab 32. Wire harness 12 for movable structure 10 may then be routed along, through, or coupled to bracket 30. Although described as a two-part system, mounting structure 22 may also be constructed in a one-piece design, omitting bracket 30 by having mounting frame 28 attach directly to movable structure 10.

Figure 5:
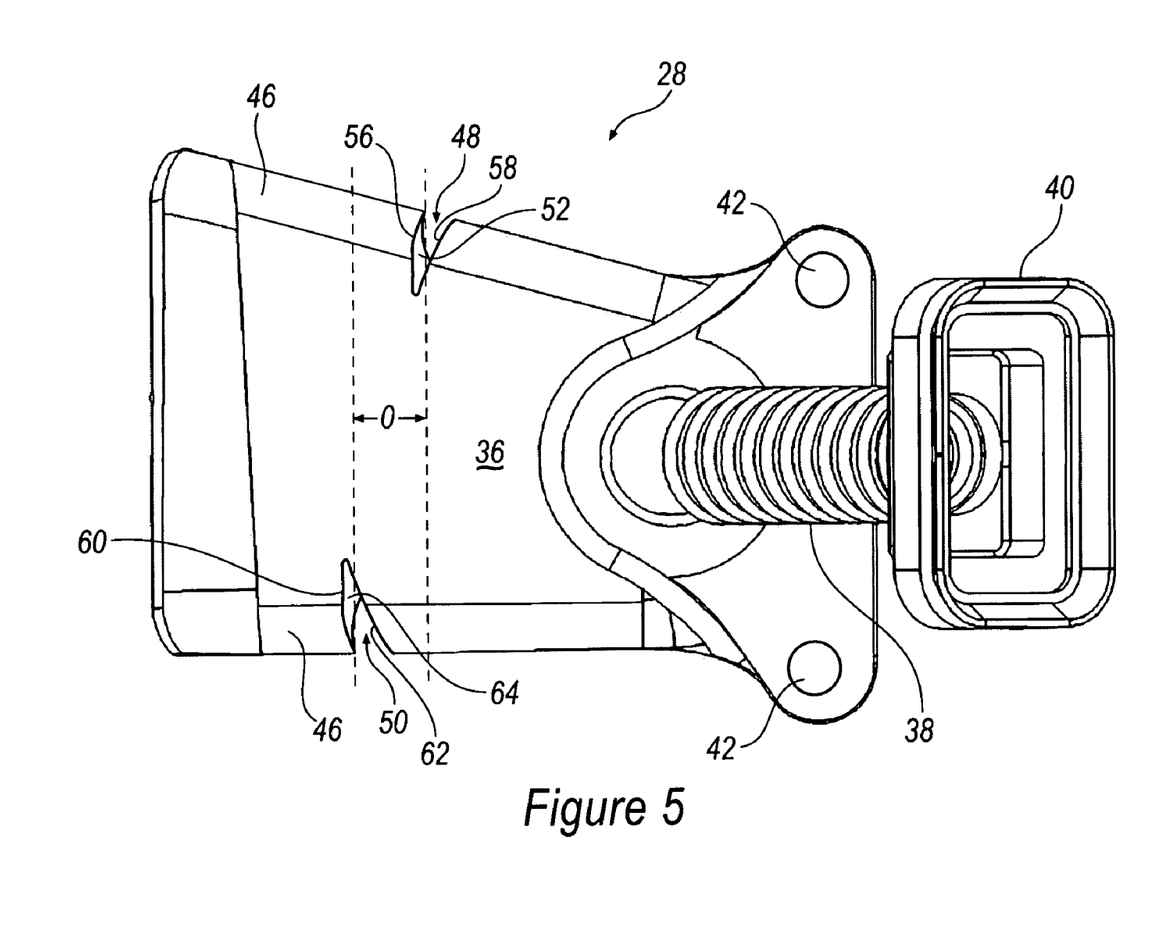
FIG. 5 is a front view an exemplary mounting structure, according to an embodiment.

As shown in FIGS. 4 and 5, mounting frame 28 includes a generally L-shaped base 36, a conduit 38, a connector boot 40 and bolt holes 42 for attaching mounting structure 22 to movable structure 10. Conduit 38 is attached to base 36 and forms an enclosed pathway for wire harness 12 to travel through as it is routed from movable structure 10 to the fixed structure. Conduit 38 is a generally flexible tube terminates at connector boot 40. The connector 14 of wire harness 12 can then mate with a corresponding receptacle or connector in the fixed structure. Connector boot 40 can be used to cover and provide a protective seal around the connection.

Base 36 may be a unitary piece of semi-flexible or semi-rigid material, such as rubber, plastic, or glass-filled nylon plastic, adapted to fit over a portion of inner panel 18 and edge face 16 of movable structure 10. Mounting frame 28 may also include one or more rigid or semi-rigid inner frames (not shown), forming a skeleton within base 36, that are then covered with a flexible material, such as a rubber covering. The rubber covering may be a separate piece adapted to fit over the inner frame, or may be bonded to an inner frame through an overmold process. An overmold process is generally where an inner frame is placed within a mold where rubber is injected over and bonds to the inner frame. Such a process forms a unitary mounting frame 28 that has both a rigid interior, and a flexible exterior. In one application, the rubber may be an ethylene propylene diene monomer (EPDM) rubber having a hardness of 50 durometer. The various specifications of the rubber may be dependent on many factors including the particular application, and the rubber hardness may vary accordingly.

Figure 6:
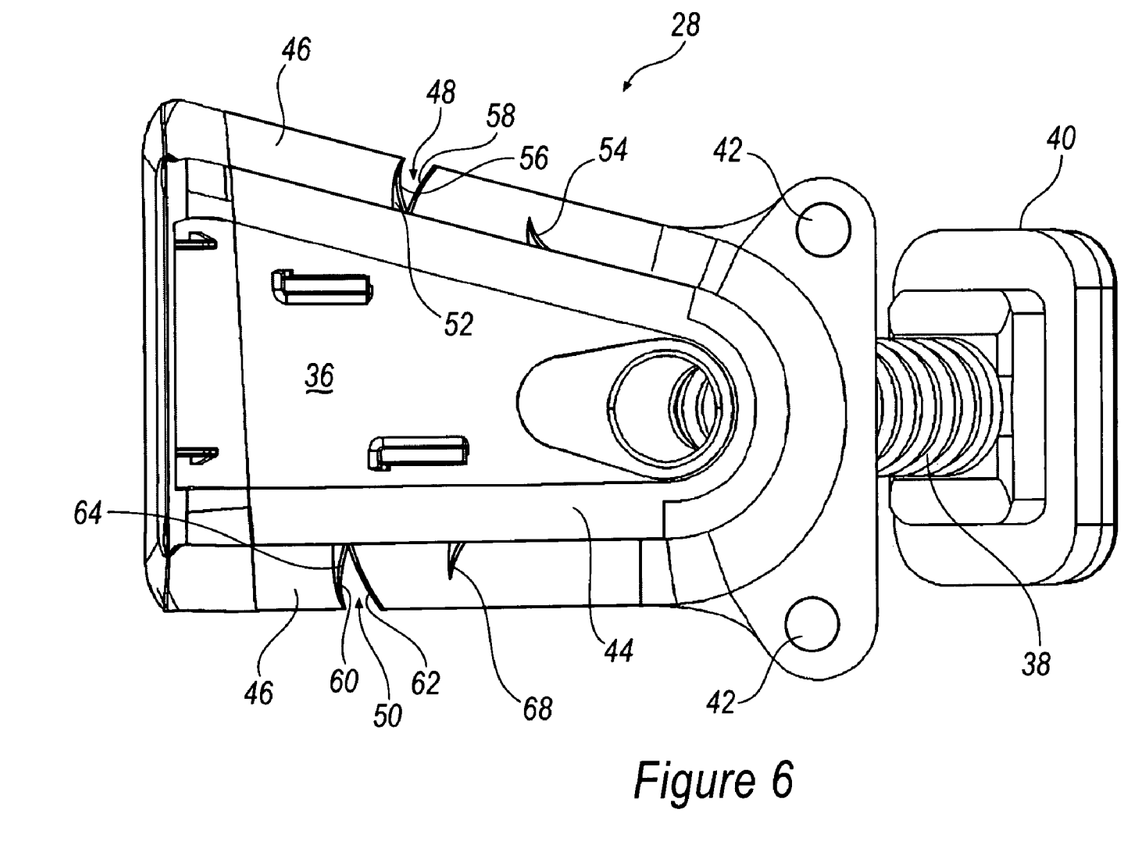
FIG. 6 is a back view of an exemplary mounting structure, according to an embodiment.

FIGS. 5 and 6 show front and back views, respectively, of mounting base 36, which includes an inner sealing lip 44, an outer sealing lip 46, and water management features consisting of an upper cut-away 48 and a lower cut-away 50. Inner and outer sealing lips 44, 46 press against door 10 to form a seal around an interior portion of the mounting structure 22. Outer sealing lip 46 may be a flexible, angled edge of base 36 that creates an interference fit against movable structure 10, and provides a first water barrier. Inner sealing lip 44 is generally a continuous, flexible, slightly protruding structure intended to create a second interference fit against edge face 16 and inner panel 18 to provide a second water barrier. Generally, when movable structure 10 is placed in the closed position, primary and secondary weather strippings 20, 26 push against mounting structure 22, thereby pressing inner and outer sealing lips 44, 46 against edge face 16 and inner panel 18. This compression force helps create the interference seals between inner and outer sealing lips 44, 46 and movable structure 10.

Water Management Features

As set forth above, and as shown in FIG. 3, at least a portion of mounting structure 22 lies in all three regions W, M, and D. To control and manage water that seeps into the moist region M, thus preventing water from entering the dry region, mounting structure 22 includes upper and lower cut-aways 48 and 50. By its nature, water adheres to most surfaces and travels along a path of least resistance. In this case, the path of least resistance is generally toward the dry region D. Upper cut-away 48 and lower cut-away 50 exploit the traveling nature of water by intercepting the water in the moist region and directing it downward toward the bottom edge of movable structure 10 and ultimately out of the vehicle.

As shown in FIG. 5, upper cut-away 48 is located in an upper portion of mounting frame 28, generally toward the top of mounting frame 28 as it would be installed on movable structure 10. Lower cut-away 50 is generally located in a lower portion of mounting frame 28, generally toward the bottom. Upper and lower cut-aways 48, 50 are generally V-shaped openings formed in outer sealing lip 46. Upper and lower cut-aways 48, 40 may be aligned, but are preferably horizontally offset from one another by a distance O. Generally, water may adhere to an edge of outer sealing lip 46 and travel from the wet region W to the moist region M. If allowed to continue, the water may travel past secondary weather stripping 26 and enter the dry region D and into the passenger compartment. As the water travels along an edge of mounting frame 28 in the moist region M, upper cut-away 48 intercepts the water and, owing to the adhesive property of water, directs it further downward along the exterior surface of base 36. Some water may then attempt to travel along the bottom edge of outer sealing lip 46 toward the dry region D. To ensure that water does not pass into the dry region D, lower cut-away 50 intercepts the water and directs it downward to edge face 16, where it can continue downward and exit the moist region M onto the road below. Therefore, in one embodiment, upper and lower cut-aways 48, 50 are complementary, working together to ensure that water does not adhere to an edge of outer sealing lip 46 and travel into the dry region D.

While traveling downward along the exterior surface of base 36, some water may travel slightly farther toward the dry region D. This type of horizontal travel may be due to the angle of the vehicle, the movement of the vehicle, the texture of the exterior surface of base 36, or other dirt or debris on the surface of mounting frame 28. To ensure that lower cut-away 50 properly intercepts the traveling water, lower cut-away 50 is offset by a distance O toward region D. Horizontal offset O further ensures that traveling water is intercepted by lower cut-away 50, and that such water continues traveling toward the bottom of movable structure 10. The distance O may be dependent upon several factors including, but not limited to, the distance between the primary and secondary weather stripping 20, 26, the overall length of base 36; the location of fasteners, and various manufacturing considerations. While one application may have a substantial horizontal offset O, other applications may have a small offset or even no offset at all. Although horizontal offset O further ensures that lower cut-away 50 catches water directed by upper cut-away 48, offset O is not required.

Figures 7, 8:
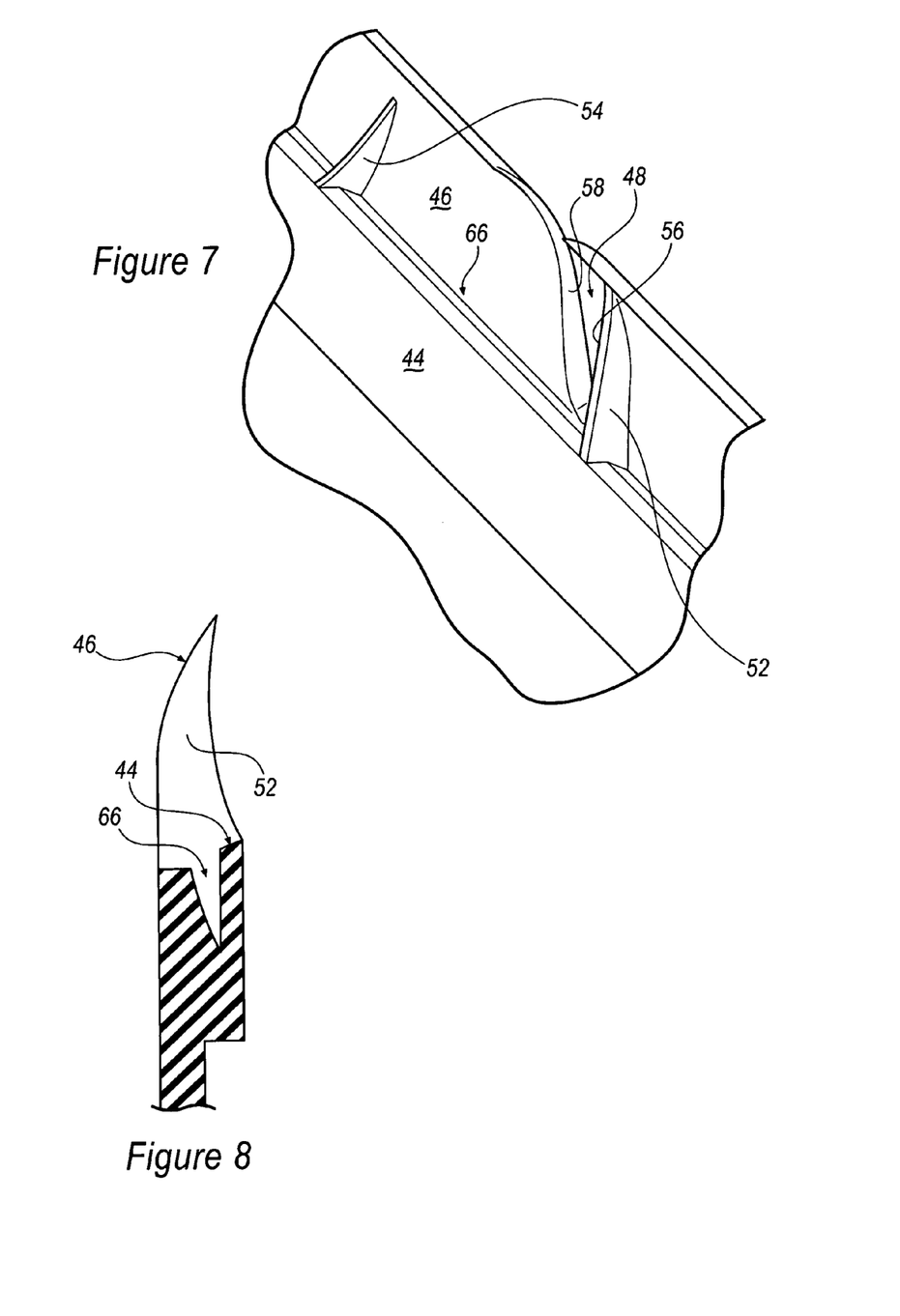
FIG. 7 is an enlarged view of a portion of an exemplary mounting structure illustrating water management features, according to an embodiment.
FIG. 8 is a cross-sectional view taken along line 8-8 of FIG. 3.

FIG. 7 illustrates an enlarged back side view of upper cut-away 48 that further includes a dam 52. Dam 52 is generally a connecting wall joining outer sealing lip 46 to inner sealing lip 44. Upper cut-away 48, as shown in FIGS. 5 and 7, may be described as having a first edge 56 and a second edge 58. First edge 56 is generally the edge closer to dry region D and may include or be connected to dam 52. Second edge 58 is generally the edge closer to wet region W. First edge 56 may be more vertical, while second edge 58 may be angled, generally toward wet region W such that water traveling along the outer periphery of outer sealing lip 46 more easily travels downward along second edge 58. In one embodiment, the first and second edges 56, 58 are both are angled. Similarly, as shown in FIG. 5, lower cut-away 50 also includes a first edge 60, a second edge 62, and a dam 64. Generally, lower cut-away 50 may be configured similarly to upper cut-away 50, where first edge 60 is more vertical and second edge 62 is more angled toward wet region W. Although not required, dams 52 and 64 serve to obstruct water that may penetrate the region between the inner and outer sealing lips 44, 46.

FIG. 8 is a cross-sectional view taken along line 8-8 of FIG. 3, and shows inner sealing lip 44, outer sealing lip 46, dam 52, and a channel 66 that lies between inner and outer sealing lips 44, 46. Channel 66 generally provides an area to allow for deformation of inner sealing lip 44. Typically, when movable structure 10 is closed, mounting structure 22 is pressed against door 10, slightly deforming inner sealing lip 44 against movable structure 10. Channel 66 generally provides the necessary space to accommodate such deformation. Although, channel 66 may also provide another area for water to migrate into and travel along. As shown in FIGS. 7 and 8, dam 52 creates a barrier in channel 66 between upper cut-away 48 and dry region D, forcing water to travel to the outside surface of base 36. For example, water may hit dam 52 and be directed inward through upper cut-away 48 toward inner sealing lip 44, and down into channel 66. Water may then travel downward, along the downward sloping channel 66 lying in between inner and outer sealing lips 44, 46. Water can then continue traveling around to the lower portion of mounting frame 28, and back toward the dry region D until it contacts lower cut-away 50, where it will be directed to the exterior of mounting frame 28. Referring back to FIG. 6, lower cut-away 50 may also include dam 64 along a first edge 62 closest to dry region D, which directs water traveling along inner sealing lip 44 in channel 66 outward toward the exterior surface of mounting frame 28.

As shown in FIG. 6, and in greater detail in FIG. 7, the interior of base 36 may also include upper and lower sub-dams 54, 68, respectively. Upper sub-dam 54 can be used to limit or prevent water from traveling along inner sealing lip 44 in channel 66. Upper sub-dam 54 may be an angled connection between inner and outer sealing lips 44, 46. Sub-dams 54, 68 may fully block water from traveling along channel 66, or may only partially obstruct water traveling along channel 66. Water entering the interior of mounting frame 28 may then contact upper dam 54 and subsequently be prevented from traveling any farther along channel 66. Water may then be forced out underneath outer sealing lip 46, or out through upper cut-away 48. Upper sub-dam 54 may also limit the amount of water traveling within channel 66, thereby preventing excess water from squeezing beneath inner sealing lip 44 and entering the interior chamber. Lower sub-dam 68 may also limit or prevent water from traveling along channel 66. Lower sub-dam 68 may also push water away from inner sealing lip 44 and downward toward the bottom of movable structure 10.

Although described for use in a vehicle door of a passenger vehicle, it should be appreciated that the disclosed mounting structure and water management features, whether together or separate, may be used for various other applications, as appreciated by those skilled in the art. For example, the disclosed water management features may be used by any sealing apparatus that mounts over an edge, or generally two planar surface, and is required to maintain a dry interior chamber. In particular, the disclosed water management features may be particularly useful for a sealing member that may provide a travel path for water to flow from a wet region to a dry region. As understood by one of ordinary skill in the art, the specific shape and configuration of mounting structure 22 may vary depending on the configuration of the vehicle or other application to which it is applied. Therefore, the present disclosure simply demonstrates one embodiment of a mounting structure, although numerous design changes and modifications may be made without departing from the spirit or scope of the present disclosure.

While the present invention has been particularly shown and described with reference to the foregoing preferred embodiment, with examples described in terms of their implementation in a vehicle door, it should be understood by those skilled in the art that various alternatives to the embodiments of the invention described herein may be employed in practicing the invention without departing from the spirit and scope of the invention as defined in the following claims. For example, it should be appreciated that the invention may be practiced and is applicable wherever a host electrical device requires the passage of a wiring harness between components that may move relative to one another and where the need to manage exposure to moisture and other forms of liquid contamination also exists. It is intended that the following claims define the scope of the invention and that the method and system within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiment is illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

We claim:

1. A mounting structure for a wire harness in a movable structure comprising:
    a generally L-shaped mounting frame configured to mount a wire harness to the movable structure;
    an outer sealing lip running along the periphery of the mounting frame;
    a conduit connected to the mounting frame, wherein the conduit forms an enclosed wire pathway between the movable structure and a fixed structure; and
    a first cut-away located in an upper portion of the mounting frame and formed in the outer sealing lip;
    wherein the mounting frame further comprises an inner sealing lip, and wherein the first cut-away further includes a dam that runs from the outer sealing lip to the inner sealing lip.

2. The mounting structure of claim 1, further comprising a second cut-away located in a lower portion of the mounting frame and formed in the outer sealing lip.

3. The mounting structure of claim 1, wherein the first cut-away is generally V-shaped.

4. The mounting structure of claim 1, wherein the first cut-away has a first edge and a second edge generally configured in a modified V-shape, wherein the first edge is substantially vertical and the second edge angles toward a wet region.

5. The mounting structure of claim 4, wherein the first edge of the V is closest to a dry region and the second edge of the V is closest to a wet region.

6. The mounting structure of claim 1, wherein the first cut-away lies in a moist region along the movable structure, and includes the a dam positioned on an edge closest to a dry region.

7. The mounting structure of claim 1, wherein the mounting frame includes a second cut-away located in a lower portion that is offset horizontally from the first cut-away such that the first cut-away is closer to a wet region and the second cut-away is closer to a dry region.

8. The mounting structure of claim 1, wherein the movable structure is a vehicle door.

9. A mounting structure for a wire harness in a movable structure comprising:
    a generally L-shaped mounting frame configured to mount a wire harness to the movable structure;
    an outer sealing lip running along the periphery of the mounting frame;
    a conduit connected to the mounting frame, wherein the conduit forms an enclosed wire pathway between the movable structure and a fixed structure; and
    a first cut-away located in an upper portion of the mounting frame and formed in the outer sealing lip;
    wherein the mounting frame further comprises an inner sealing lip. and wherein the inner sealing lip includes upper and lower sub-dams.

10. The mounting structure of claim 9, further comprising a generally L-shaped bracket configured to lit within a generally L-shaped recess located in the movable structure, wherein the wire harness is secured between the L-shaped bracket and the mounting frame.

11. The mounting structure of claim 9. wherein the upper portion of the mounting frame is angled. having a higher end closer to a dry region and a lower end closer to a wet region.

12. A sealing product comprising:
    a generally L-shaped sealing member having an outer sealing lip, wherein the sealing member is configured to exclude contaminants from an interior area;
    a first cut-away formed in the outer sealing lip and located in an upper portion of the sealing member; and
    a second cut-away formed in the outer sealing lip and located in a lower portion of the sealing member;
    wherein the first and second cut-aways further include a dam that runs from the outer sealing lip to an inner sealing lip.

13. The sealing product of claim 12, wherein the first and second cut-aways are generally V-shaped.

14. A sealing product comprising:
    a generally L-shaped sealing member having an outer sealing lip, wherein the sealing member is configured to exclude contaminants from an interior area;
    a first cut-away formed in the outer sealing up and located in an upper portion of the sealing member;
    a second cut-away formed in the outer sealing lip and located in a lower portion of the sealing member; and
    upper and lower sub-dams positioned between first and second cut-aways and a wet region.

15. The sealing product of claim 14, wherein the first and second cut-aways are horizontally offset.

16. A mounting structure for a wire harness in a movable structure comprising:
    a generally L-shaped bracket configured to fit within a generally L-shaped recess located in a movable structure, wherein the bracket includes a fastener configured to secure the bracket against the recess;
    a generally L-shaped mounting frame configured mount to the movable structure and encase a wire harness in between the mounting frame and the bracket, wherein the mounting frame includes:
    an outer sealing lip that forms a first interference seal against the movable structure and is positioned along an outer periphery of the mounting frame; and
    an inner sealing lip that forms a secondary interference seal against the movable structure and positioned on an interior surface of the mounting frame, wherein the outer sealing lip includes a first cut-away located in an upper portion of the mounting frame formed in the outer sealing lip, and a second cut-away located in a lower portion of the mounting frame formed in the outer sealing lip;
    wherein the first and second cut-aways include a dam connecting the outer sealing lip to the inner sealing lip.

17. The mounting structure of claim 16, wherein the first and second cut-aways are generally V-shaped.

* * * * *